United States Patent [19]
Harris et al.

[11] Patent Number: 5,892,313
[45] Date of Patent: *Apr. 6, 1999

[54] ROTATING ELECTRICAL MACHINE WITH PERMANENT MAGNET INSERTS

[75] Inventors: Richard Kenneth Harris, Walled Lake; Michael Timothy York, Chelsea, both of Mich.

[73] Assignee: Ford Motor Company, Dearborn, Mich.

[ * ] Notice: The term of this patent shall not extend beyond the expiration date of Pat. No. 5,543,676.

[21] Appl. No.: 726,373

[22] Filed: Oct. 4, 1996

[51] Int. Cl.⁶ .................................................. H02K 1/22
[52] U.S. Cl. ........................... 310/263; 310/156; 310/271
[58] Field of Search ................................. 310/263, 59, 65, 310/61, 192, 156, 216, 231, 43, 44, 67 R, 235, 214, 270, 271; 74/574

[56] References Cited

U.S. PATENT DOCUMENTS

| | | | |
|---|---|---|---|
| 3,346,749 | 10/1967 | Shafranek | 310/263 |
| 3,411,027 | 11/1968 | Rosenberg | 310/152 |
| 3,553,510 | 1/1971 | Howey | 310/156 |
| 3,555,327 | 1/1971 | Terry | 310/168 |
| 4,433,261 | 2/1984 | Nashiki et al. | 310/156 |
| 4,445,062 | 4/1984 | Glaser | 310/156 |
| 4,584,496 | 4/1986 | Frister | 310/60 R |
| 4,855,630 | 8/1989 | Cole | 310/156 |
| 4,882,515 | 11/1989 | Radomski | 310/263 |
| 4,930,201 | 6/1990 | Brown | 29/598 |
| 4,959,577 | 9/1990 | Radomski | 310/263 |
| 4,972,114 | 11/1990 | Frister | 310/263 |
| 4,980,595 | 12/1990 | Arora | 310/263 |
| 5,047,680 | 9/1991 | Torok | 310/156 |
| 5,130,595 | 7/1992 | Arora | 310/268 |
| 5,132,581 | 7/1992 | Kusase | 310/263 |
| 5,177,391 | 1/1993 | Kusase | 310/263 |
| 5,382,862 | 1/1995 | Ward et al. | 310/263 |
| 5,543,676 | 8/1996 | York et al. | 310/263 |
| 5,552,651 | 9/1996 | Radomski | 310/181 |

FOREIGN PATENT DOCUMENTS

| | | | |
|---|---|---|---|
| 7-312 854 A | 11/1995 | Japan | H02K 21/04 |

*Primary Examiner*—Thomas M. Dougherty
*Assistant Examiner*—Burt Mullins
*Attorney, Agent, or Firm*—Mark S. Sparschu

[57] ABSTRACT

In one embodiment of the present invention, a rotor for an electrical machine comprises a first pole piece and a second pole piece together defining an axis of rotation of the rotor, each pole piece comprising a generally disc-shaped body having a circumference. Each pole piece further has a plurality of angularly-spaced pole fingers extending axially from the circumference of the body of the pole piece. The rotor additionally includes a plurality of permanent magnets, each permanent magnet affixed to a body of a pole piece between two pole fingers of the pole piece. In a second embodiment, the present invention provides a method for manufacturing a rotor for an electrical machine, the rotor comprising a first pole piece and a second pole piece together defining an axis of rotation of the rotor, each pole piece comprising a generally disc-shaped body having a circumference, each pole piece further comprising a plurality of angularly-spaced pole fingers extending axially from the circumference of the body of the pole piece, each body of each pole piece further defining a plurality of radially-outwardly-opening recesses between adjacent pole fingers of the pole piece. The method comprises affixing permanent magnets into at least some of the recesses. In some embodiments, the present invention facilitates the use of generally-conventional Lundell electrical machine technology, but with considerably increased power output per unit volume of the machine.

15 Claims, 3 Drawing Sheets

5,892,313

ROTATING ELECTRICAL MACHINE WITH PERMANENT MAGNET INSERTS

BACKGROUND OF THE INVENTION

1. Field of the Invention

The present invention relates to electrical machines.

2. Description of the Related Art

Lundell or "claw pole" alternators are well-known, for example as electrical generators for motor vehicles. Such machines have very attractive attributes such as low cost and a mature design. However, with the ever-increasing electrical accessory content on motor vehicles, the need for greater electrical generating capacity is needed.

Certainly, one option is to use larger and larger Lundell alternators. However, the generally reducing size of vehicles makes packaging larger and larger alternators difficult. Thus, an alternator with a higher power density (that is, more power output per unit volume of the machine) than a conventional Lundell alternator can prove advantageous.

However, as was mentioned above, Lundell alternators themselves have considerable advantages. Thus, an electrical machine design which preserves the advantages of a conventional Lundell machine while increasing its power density will provide advantages over alternative designs. Increasing the power density of the Lundell machine without abandoning the basic Lundell design can certainly help preserve the cost advantages of a Lundell machine. Also, using a modification of the basic Lundell design can allow the wealth of design and manufacturing expertise which has been developed in connection with Lundell machines to continue to be used.

Therefore, an electrical machine design which can provide higher power density within the general parameters of Lundell machine design can provide advantages over the prior art.

SUMMARY OF THE INVENTION

The present invention provides a rotor for an electrical machine. The rotor comprises a first pole piece and a second pole piece together defining an axis of rotation of the rotor, each pole piece comprising a generally disc-shaped body having a circumference, each pole piece further having a plurality of angularly-spaced pole fingers extending axially from the circumference of the body of the pole piece. The rotor additionally includes a plurality of permanent magnets, each permanent magnet affixed to a body of a pole piece between two pole fingers of the pole piece.

The present invention further provides a method for manufacturing a rotor for an electrical machine, the rotor comprising a first pole piece and a second pole piece together defining an axis of rotation of the rotor, each pole piece comprising a generally disc-shaped body having a circumference, each pole piece further comprising a plurality of angularly-spaced pole fingers extending axially from the circumference of the body of the pole piece, each body of each pole piece further defining a plurality of radially-outwardly-opening recesses between adjacent pole fingers of the pole piece. The method comprises affixing permanent magnets into at least some of the recesses.

In some embodiments, the present invention facilitates the use of generally-conventional Lundell machine technology, but with considerably increased power output per unit volume of the machine. In doing so, the present invention provides significant advantages over alternative designs.

BRIEF DESCRIPTION OF THE INVENTION

FIG. 1 is an exploded view of a rotor 10 for an electrical machine, the rotor 10 including permanent magnet inserts 34.

Figure 4:
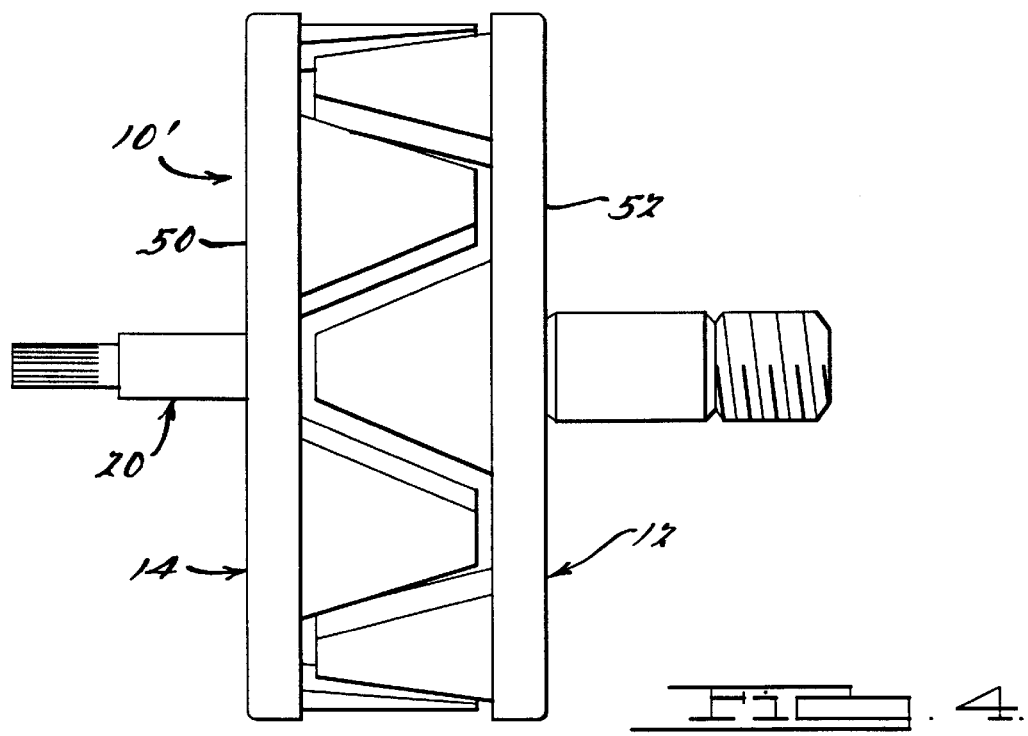

FIG. 4 is a side view of a rotor 10' according to a second embodiment of the present invention, where bands 50 and 52 help retain permanent magnets 34.

Figure 5:
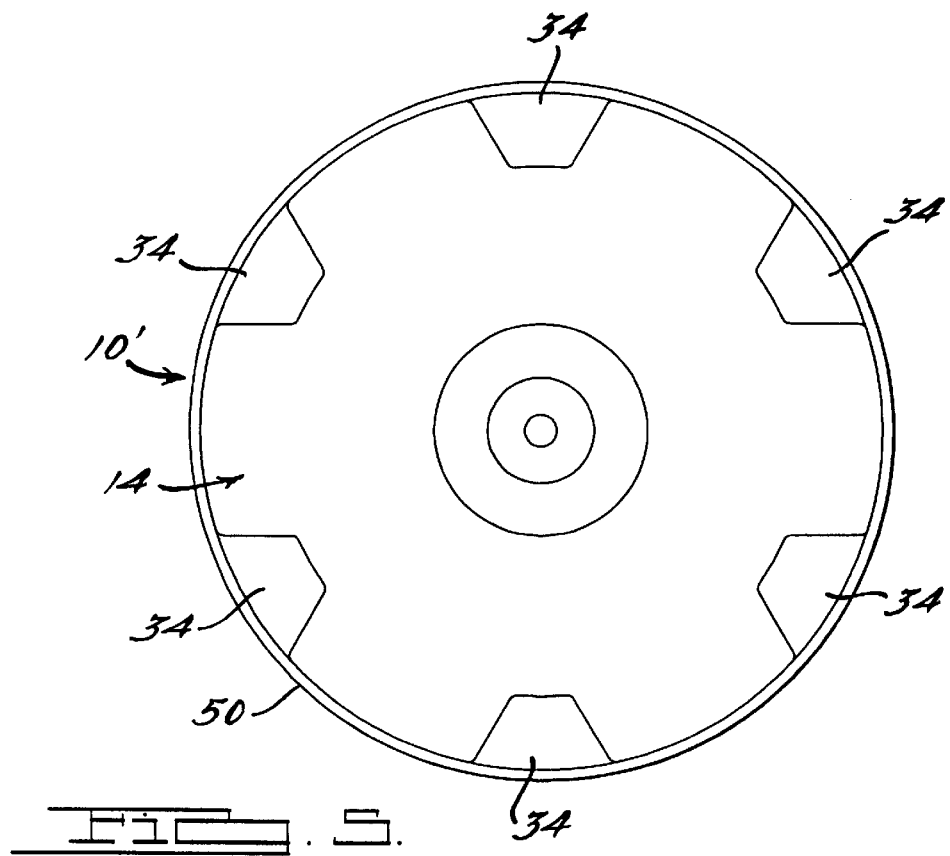

FIG. 5 is an end view of rotor 10' of FIG. 4.

DETAILED DESCRIPTION OF THE PREFERRED EMBODIMENT

Figure 1:
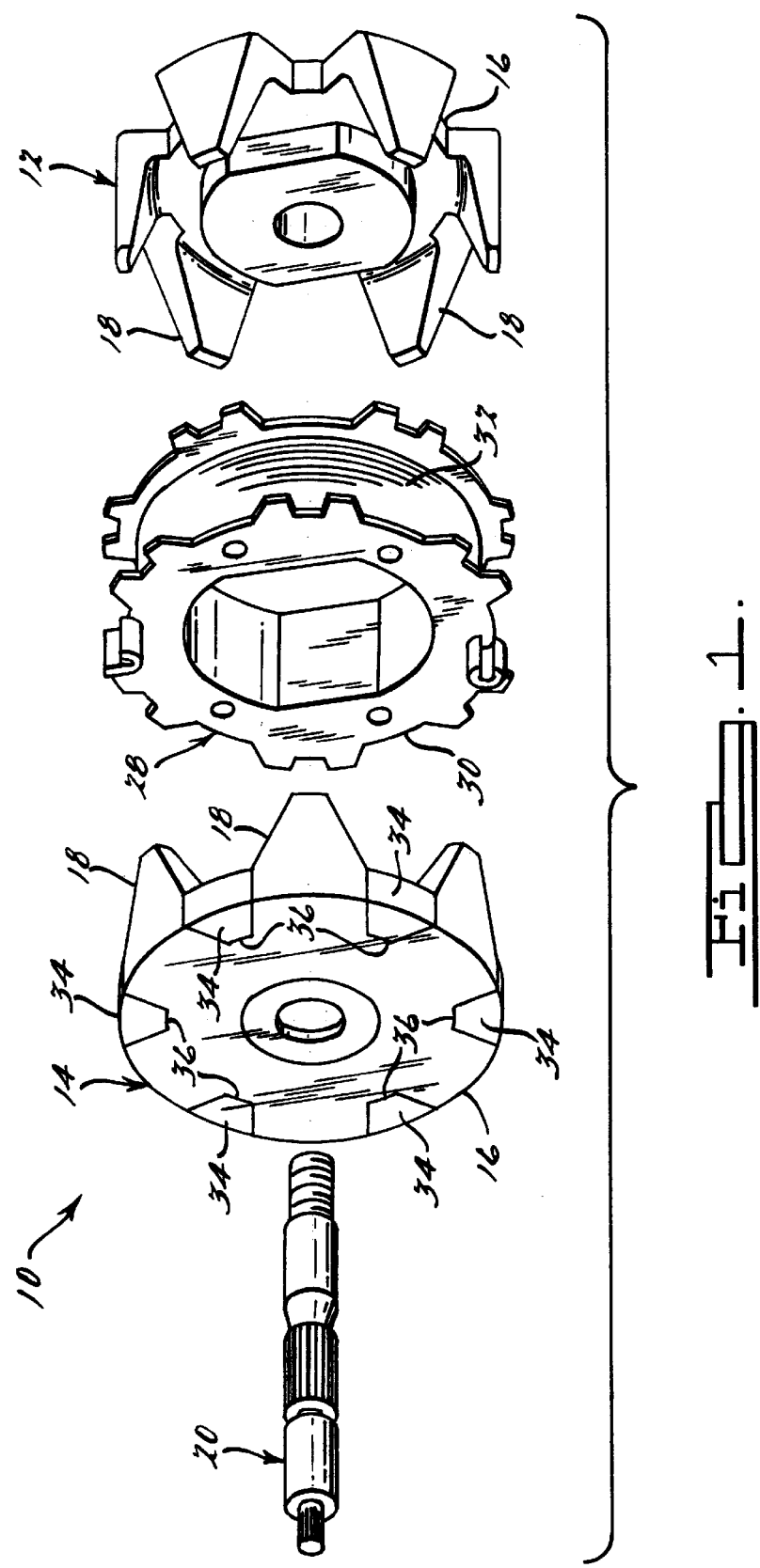

Referring first to FIG. 1, relevant portions of a rotor 10 for an electrical machine such as a motor vehicle alternator are illustrated. The rotor includes a first pole piece 12 and a second pole piece 14. Each pole piece includes a generally disc-shaped body 16. Each pole piece further comprises a plurality of pole fingers 18 which are angularly disposed about a circumference of their respective pole piece 12 or 14 and which extend axially from the body 16 of the pole piece.

Pole pieces 12 and 14 are mounted on a shaft 20 and along with shaft 20 define an axis of rotation of rotor 10. Rotor 10 further comprises a field coil 28 which itself comprises a bobbin 30 and wire 32. Field coil 28 is mounted within first pole piece 12 and second pole piece 14 for rotation therewith. Those skilled in the art will recognize rotor 10 as being generally of the "Lundell" or "claw pole" configuration.

Additionally shown mounted on pole piece 14 are a plurality of permanent magnets 34. Each permanent magnet 34 is mounted between two pole fingers 18 within the radially-outwardly-opening recess 36 between each pair of pole fingers 18. Although omitted in FIG. 1 for clarity in showing the structure of pole piece 12, permanent magnets are also similarly provided between pole fingers 18 of pole piece 12.

Figure 2:
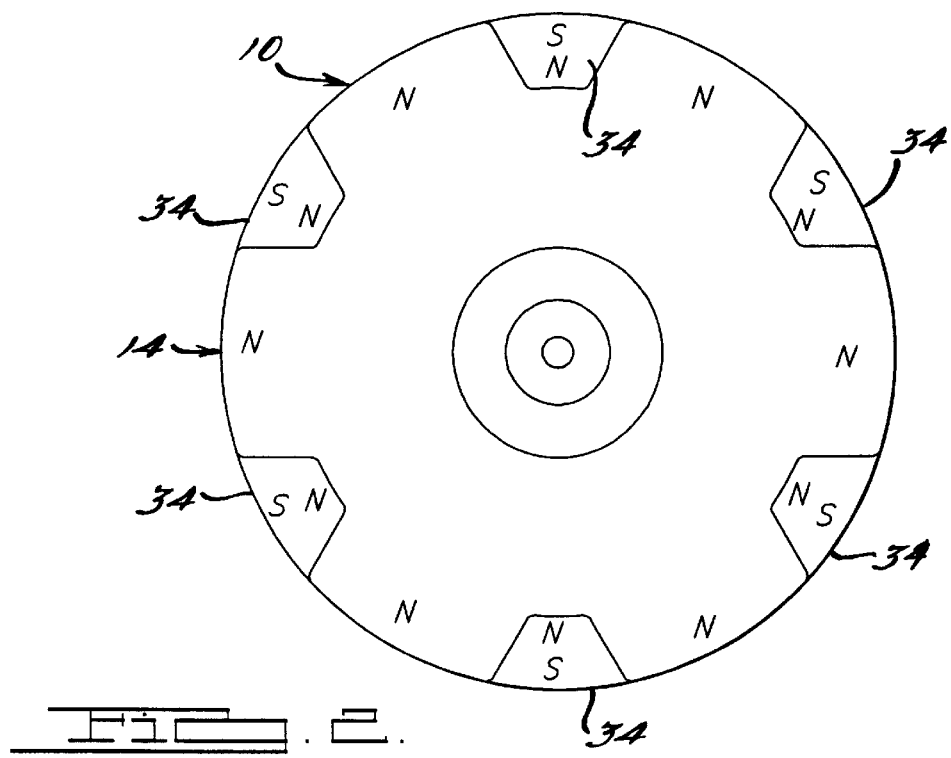
FIG. 2 is an end view of rotor 10 of FIG. 1.
Figure 3:
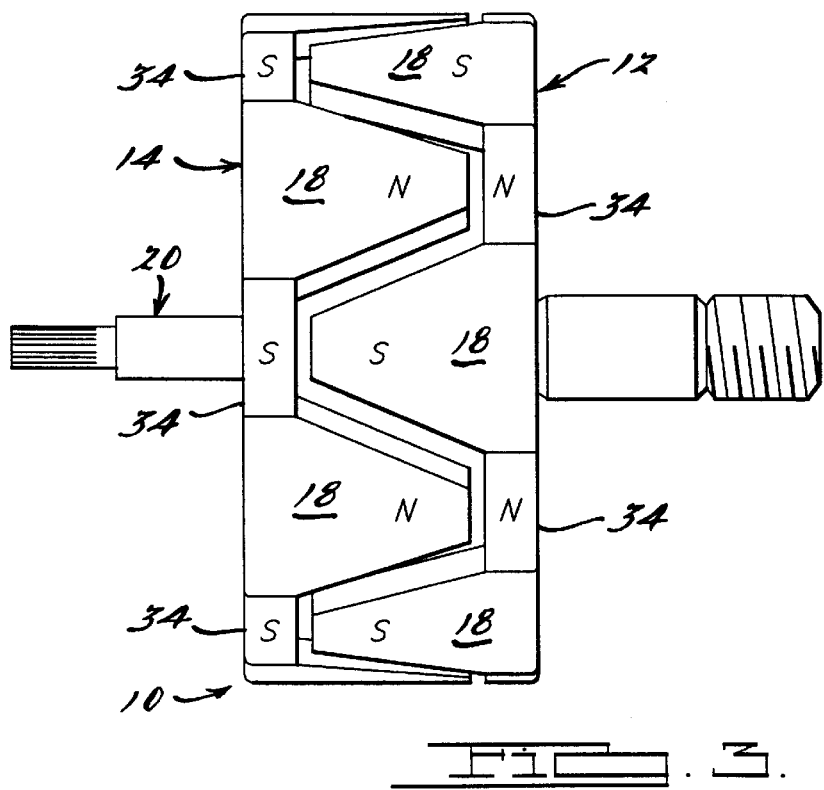
FIG. 3 is a side view of rotor 10 of FIG. 1.

Refer now additionally to FIGS. 2 and 3. FIG. 2 is an end view of rotor 10 and FIG. 3 is a side view of rotor 10. Assume that pole piece 14 is the pole piece whose pole fingers 18 are magnetized as north poles by energization of field coil 28. The permanent magnets 34 affixed to pole piece 14 are preferably magnetized such that their radially-outward portions have south magnetic polarity and their radially-inward portions have north magnetic polarity.

On the other hand, for permanent magnets 34 mounted to pole piece 12, those permanent magnets 34 will each have a radially-outward portion preferably having north polarity and a radially-inward portion preferably having south polarity. Pole fingers 18 of pole piece 12 will be magnetized as south poles by the energization of field coil 28. Note that in FIGS. 2 and 3, north and south magnetic poles are designated by "N" and "S", respectively.

It has been demonstrated that a rotor 10 including permanent magnets 34 as described in this embodiment of the present invention has a considerably higher power output than a conventional "Lundell" rotor of otherwise comparable physical size and design. It is believed that this performance is very largely due to the unique mounting locations of permanent magnets 34. The magnetic flux of permanent magnets 34 directly links with the stator (not shown) of the machine, without significantly going through the bodies of pole pieces 12 and 14. Thus, magnetic saturation of the bodies of pole pieces 12 and 14 due to the flux from field coil 28 does not appreciably degrade the ability of permanent magnets 34 to add to the flux linking the stator of the machine. Thus, the power output of the machine is increased without increasing the machine's physical size.

Permanent magnets 34 can be mounted to pole pieces 12 and 14 with, for example, adhesive.

Alternatively or additionally, permanent magnets 34 can be mounted to pole pieces 12 and 14 by one or bands mounted about the circumference of rotor 10. This alternative is illustrated with reference to FIGS. 4 and 5. In the embodiment illustrated there, two bands 50 and 52 are placed about the circumference of rotor 10'. These bands 50 and 52 help retain permanent magnets 34, preventing radially-outward movement of permanent magnets 34.

Bands 50 and 52 are preferably non-magnetic and can be made of, for example, stainless steel, aluminum, or a composite material comprising carbon fiber (or similar material) and polymer resin. If bands 50 and 52 are made of metal, they can be first heated to cause them to circumferentially expand. Once they have expanded, they can be slipped onto rotor 10'. When bands 50 and 52 then cool, they will have a very secure fit to rotor 10'. If bands 50 and 52 are of a composite material, they can, for example, be wound directly onto rotor 10'.

Pole pieces 12 and 14 are preferably reduced in radius (by, for example, machining) in the two areas where bands 50 and 52 are affixed. This reduction in radius will allow the radially-outward surface of bands 50 and 52 to be flush with the radially-outward surfaces of pole fingers 18. Thus, the air gap between the radially-outward surfaces of pole fingers 18 and the stator of the electrical machine containing rotor 10' will not be increased by the addition of bands 50 and 52.

Further, bands 50 and 52 are preferably no thicker than needed to provide the strength to carry out their function described herein. Given that in the preferred design, portions of pole pieces 12 and 14 are reduced in radius where bands 50 and 52 are attached, this reduction in radius can tend to somewhat reduce the flux between rotor 10 and the stator (not shown) of the machine. That is, the air gap between rotor 10 and the stator is increased at the locations where bands 50 and 52 are attached. Minimizing the thickness of bands 50 and 52 decreases the reduction in radius of pole pieces 12 and 14 where bands 50 and 52 are mounted.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rotor for an electrical machine, said rotor comprising:

a first pole piece and a second pole piece together defining an axis of rotation of said rotor, each said pole piece comprising a generally disc-shaped body having a circumference, each said pole piece further having a plurality of angularly-spaced pole fingers extending axially from said circumference of said body of said pole piece; and a plurality of permanent magnets, each permanent magnet affixed to a body of a said pole piece between two said pole fingers of said pole piece.

2. A rotor for an electrical machine as recited in claim 1, wherein each said permanent magnet is affixed between exactly two said pole fingers of a said pole piece.

3. A rotor for an electrical machine as recited in claim 1, wherein:

each said body of each said pole piece defines a plurality of radially-outwardly-opening recesses between adjacent pole fingers of said pole piece; and each said permanent magnet is located within one of said recesses.

4. A rotor for an electrical machine as recited in claim 3, wherein each said permanent magnet has a radially-inward portion and a radially-outward portion, said radially-inward portion and said radially-outward portion having opposite magnetic polarities.

5. A rotor for an electrical machine as recited in claim 4, wherein each said permanent magnet is affixed to a said body with adhesive.

6. A rotor for an electrical machine as recited in claim 4, wherein each said permanent magnet is affixed to a said body by one or more bands located about a circumference of said rotor.

7. A rotor for an electrical machine as recited in claim 6, wherein said one or more bands are made of a non-magnetic material.

8. A rotor for an electrical machine as recited in claim 7, wherein said non-magnetic material is stainless steel.

9. A rotor for an electrical machine as recited in claim 7, wherein said non-magnetic material is aluminum.

10. A rotor for an electrical machine as recited in claim 7, wherein said non-magnetic material is a composite comprising carbon fiber or polymer resin.

11. A rotor for an electrical machine as recited in claim 3, wherein each said permanent magnet is affixed to a said body by one or more bands located about a circumference of said rotor.

12. A rotor for an electrical machine as recited in claim 11, wherein said one or more bands are made of a non-magnetic material.

13. A rotor for an electrical machine as recited in claim 12, wherein said non-magnetic material is stainless steel.

14. A rotor for an electrical machine as recited in claim 12, wherein said non-magnetic material is aluminum.

15. A rotor for an electrical machine as recited in claim 12, wherein said non-magnetic material is a composite comprising carbon fiber or polymer resin.

* * * * *